United States Patent
Brossier et al.

[11] Patent Number: 6,050,522
[45] Date of Patent: Apr. 18, 2000

[54] THRUST REVERSER FOR A HIGH BYPASS TURBOFAN ENGINE

[75] Inventors: Pascal Noël Brossier, Lieusaint; Philippe Jean-Pierre Pabion, Le Mee S/Seine, both of France

[73] Assignee: Societe Nationale d'Etude et de Construction de Moteurs d'Aviation (S.N.E.C.M.A.), France

[21] Appl. No.: 09/022,277

[22] Filed: Feb. 11, 1998

[30] Foreign Application Priority Data

Feb. 13, 1997 [FR] France .................................. 97 01655

[51] Int. Cl.$^7$ .............................. B64C 25/68; B64C 9/16; F02K 3/02
[52] U.S. Cl. ...................... 244/110 B; 244/216; 60/226.2
[58] Field of Search ........................ 239/265.23, 265.19; 60/226.2, 230; 244/110 B, 216

[56] References Cited

U.S. PATENT DOCUMENTS

| | | | |
|---|---|---|---|
| 3,280,561 | 10/1966 | Kutney ................................ | 244/110 B |
| 3,465,524 | 9/1969 | Wilde et al. ........................... | 60/226.2 |
| 3,601,992 | 8/1971 | Maison ................................. | 60/226.2 |
| 3,917,198 | 11/1975 | Sanders ............................... | 244/110 B |
| 3,985,319 | 10/1976 | Dean et al. ........................... | 244/216 |
| 4,698,964 | 10/1987 | Glancy ................................. | 60/226.2 |
| 4,702,442 | 10/1987 | Weiland et al. ....................... | 244/216 |
| 5,852,928 | 12/1998 | Vauchel ............................... | 60/226.2 |

FOREIGN PATENT DOCUMENTS

| | | |
|---|---|---|
| 1479131 | 4/1967 | France . |
| 2 625 261 | 6/1989 | France . |
| 2 650 861 | 2/1991 | France . |
| 2 254 882 | 10/1992 | United Kingdom . |

*Primary Examiner*—Peter M. Poon
*Assistant Examiner*—Charles R Ducker, Jr.
*Attorney, Agent, or Firm*—Bacon & Thomas PLLC

[57] ABSTRACT

A thrust reverser is disclosed for a high bypass ratio turbofan jet engine having a fan cowling forming an outer boundary of an airflow duct and a jet engine structure including a jet engine cowling. The thrust reverser has a casing affixed to the jet engine structure, the casing having a plurality of attaching yokes. A first thrust reverser flap is pivotally connected to a corresponding one of the attaching yokes and is located rearwardly of an exit of the airflow duct, each first thrust reverser flap having a distal end and being movable between a forward thrust position, and a reverse thrust position. A second thrust reverser flap is pivotally connected to the distal end of a corresponding one of the first thrust reverser flaps and is also movable between a forward thrust position, and a reverse thrust position, wherein the second thrust reverser flaps also redirect air flow emanating from the air flow duct. A linkrod connected to a corresponding one of the second thrust reverser flaps and the corresponding attaching yoke moves the second thrust reverser flap between its forward and reverse thrust positions as the corresponding first thrust reverser flap is moved between its forward and reverse thrust positions.

6 Claims, 7 Drawing Sheets

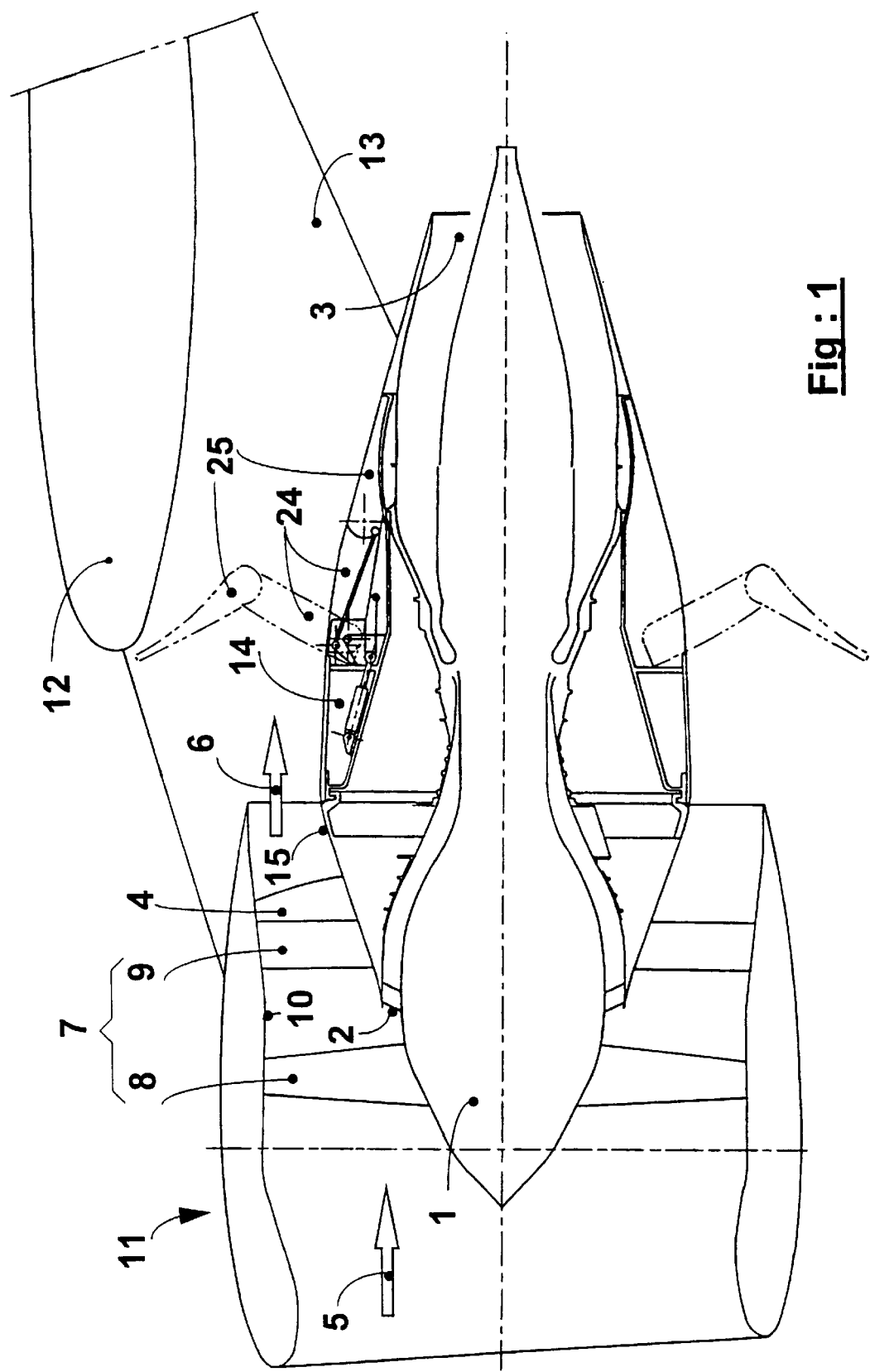
Fig : 1

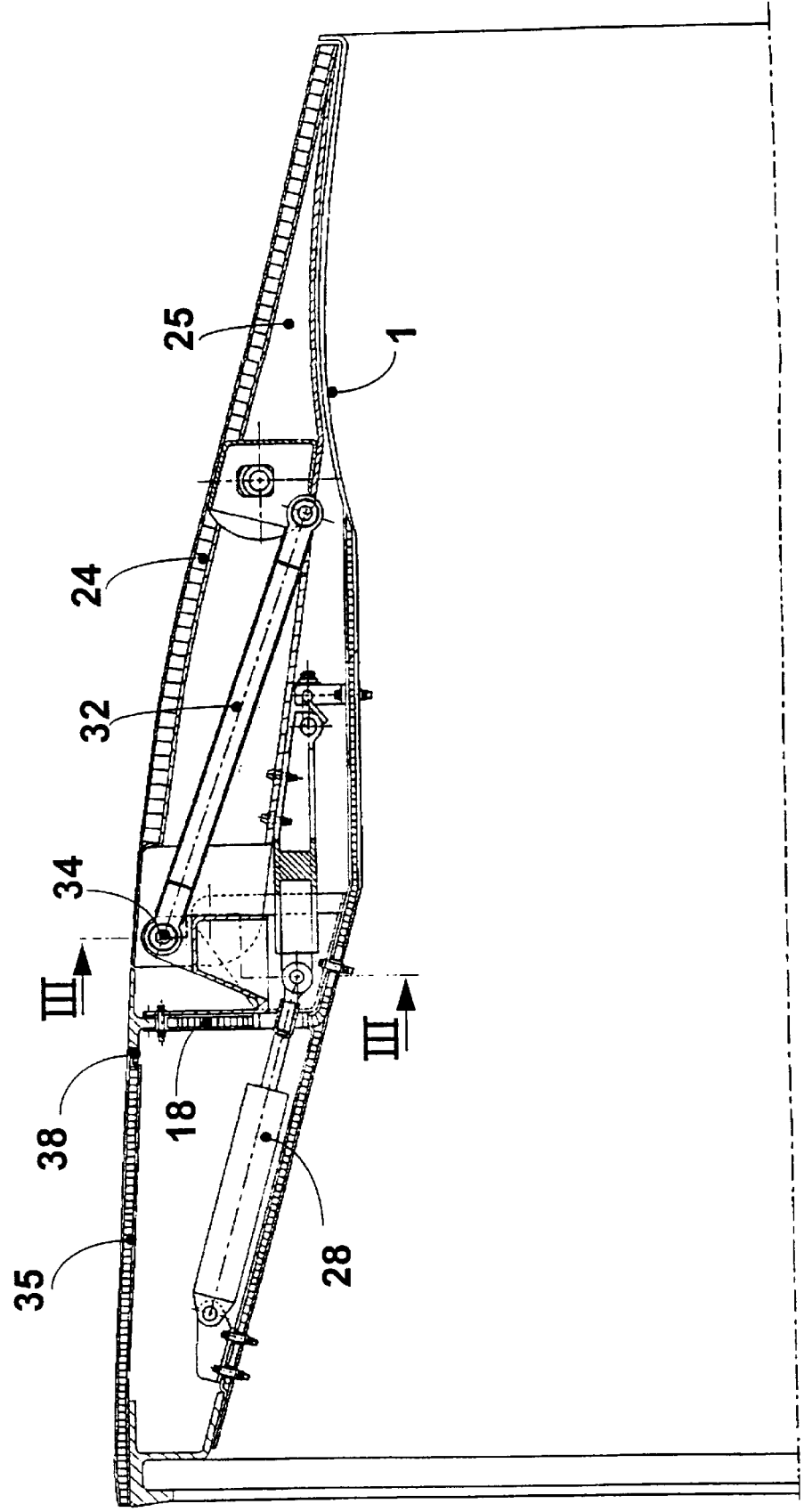

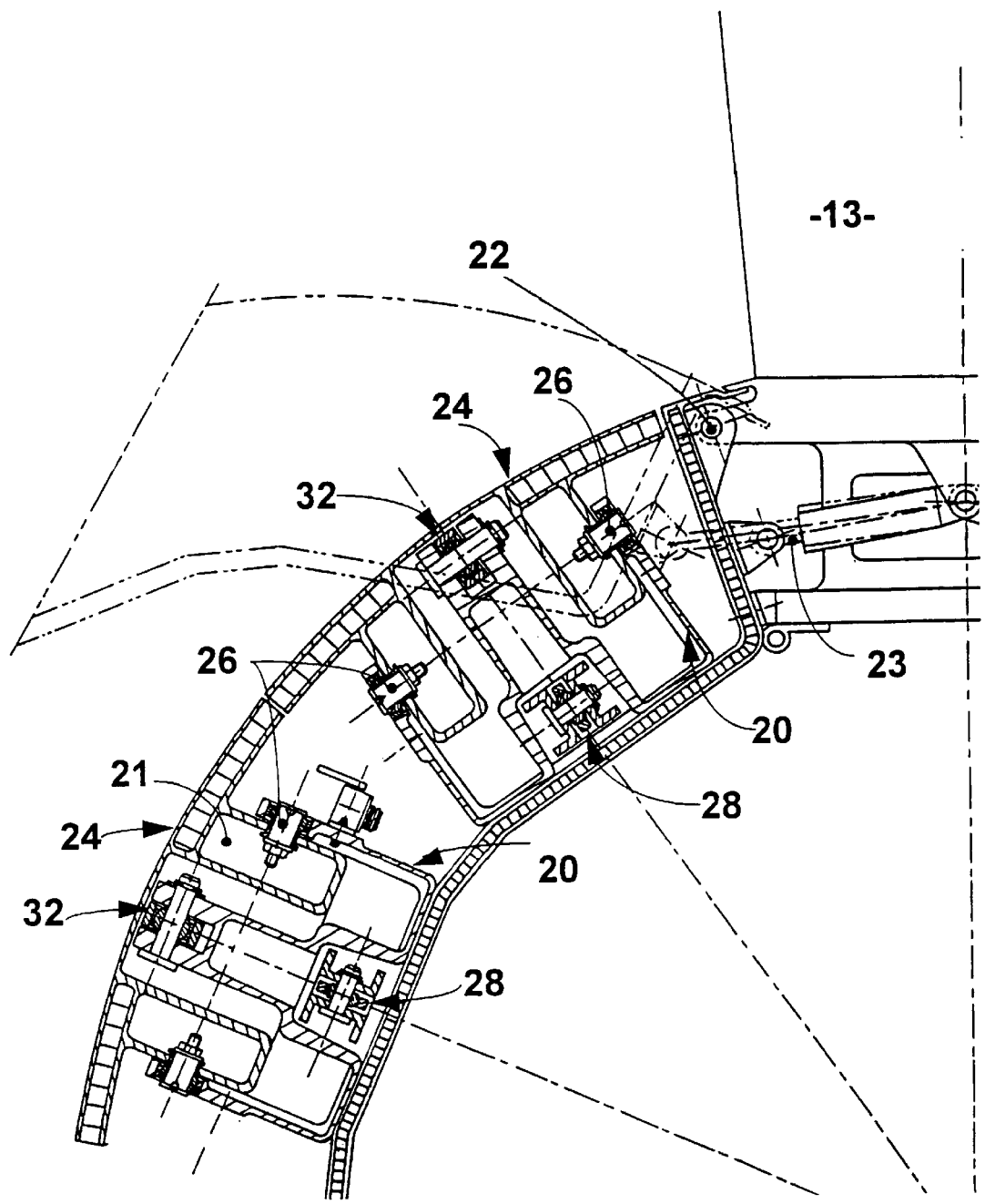
Fig :3

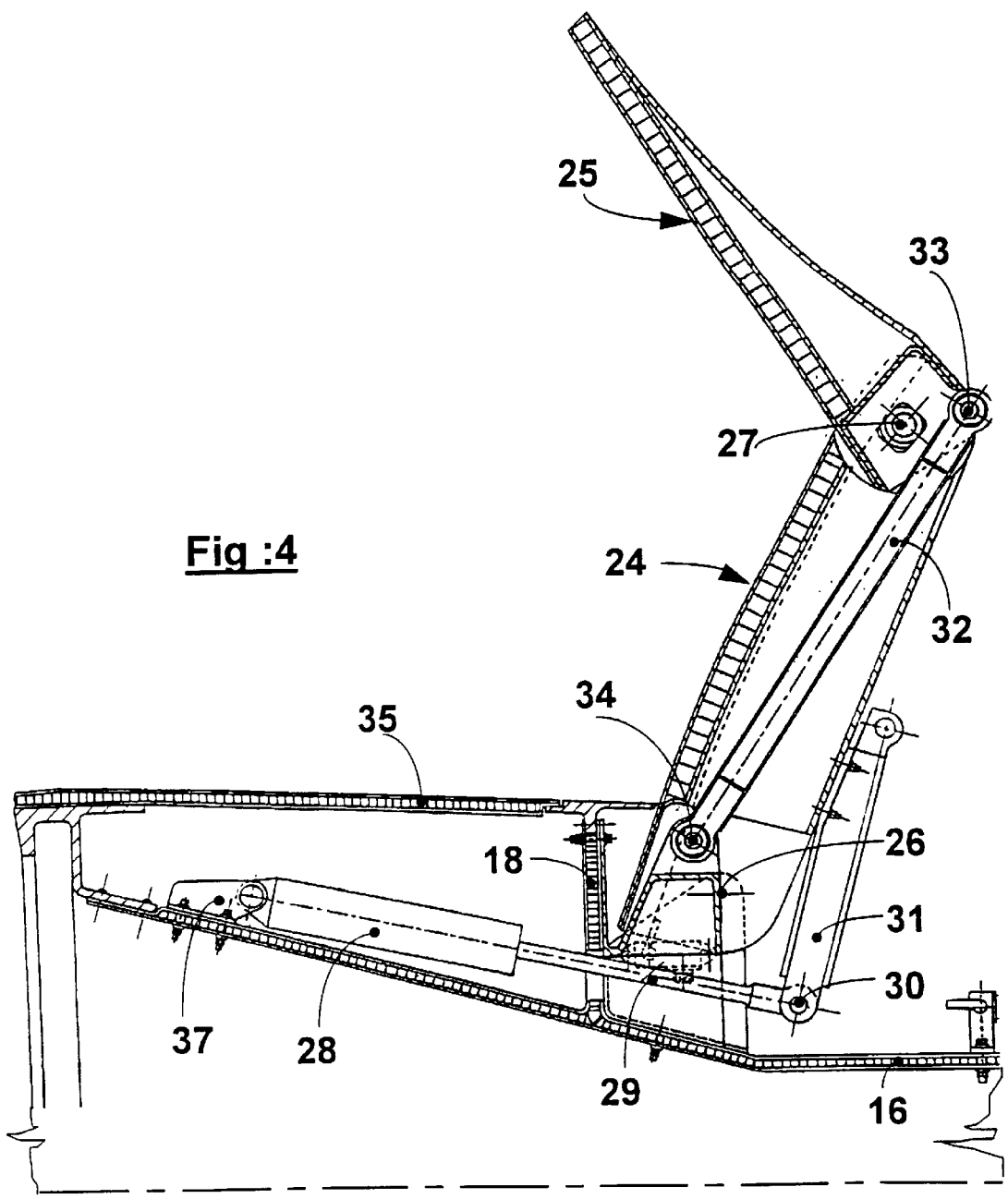

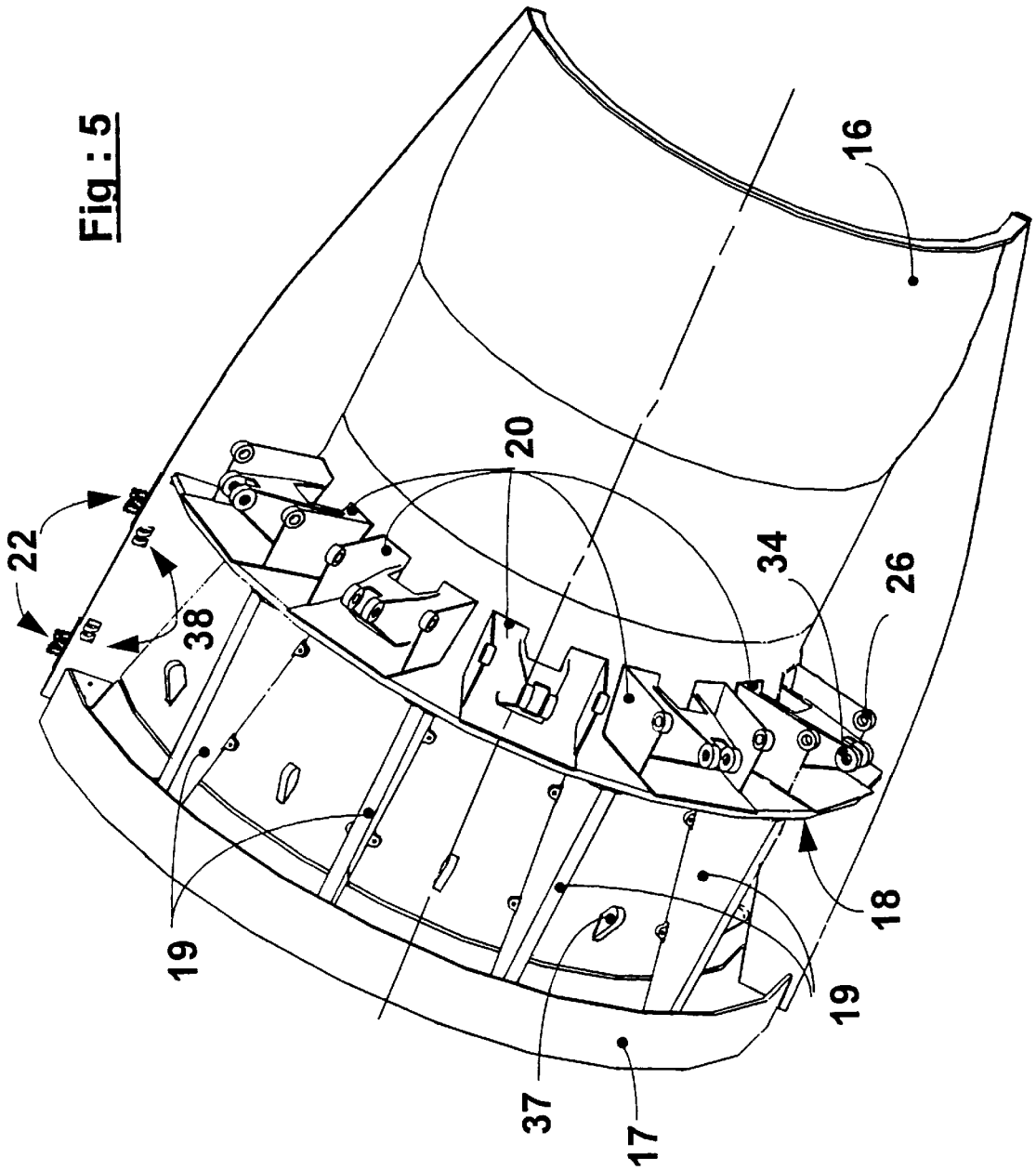
Fig: 5

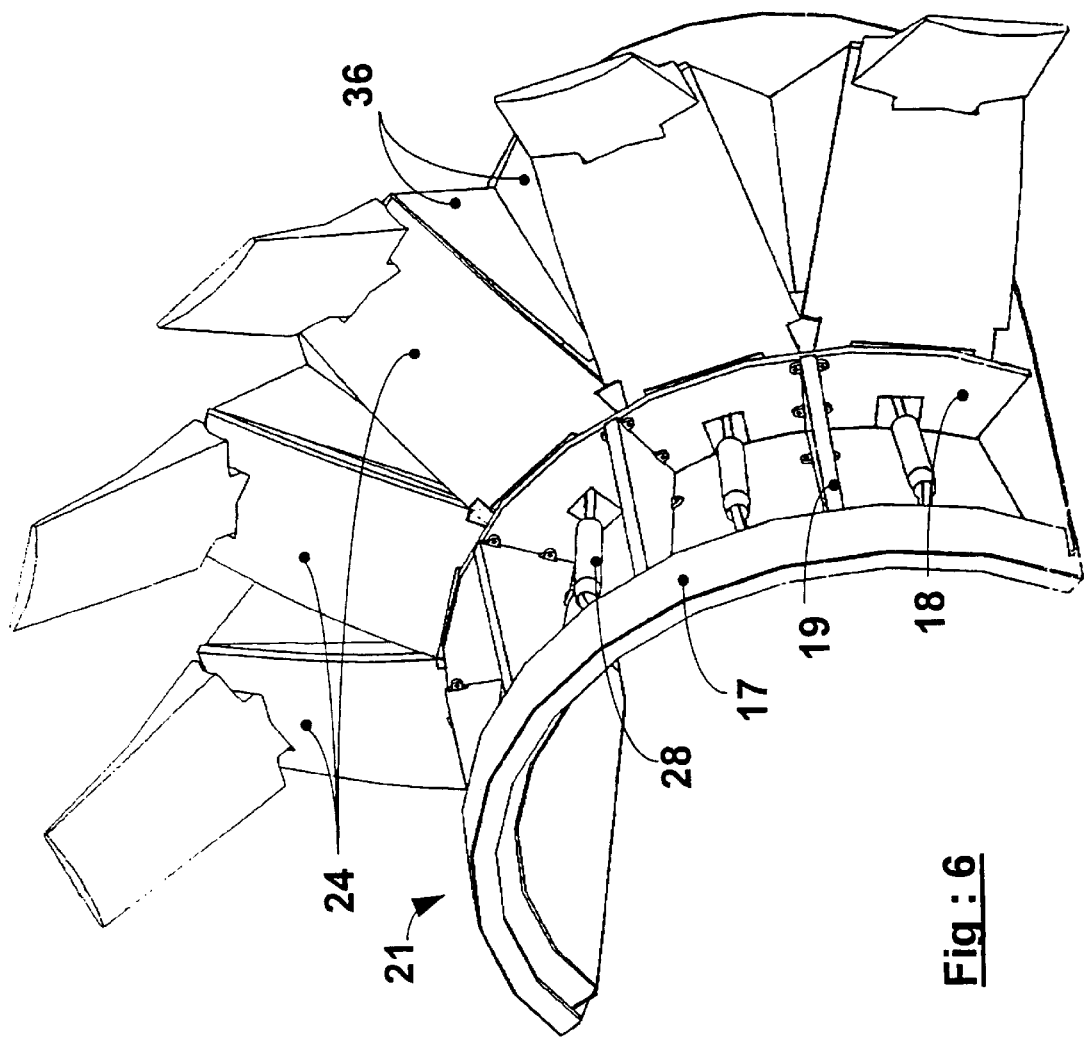
Fig : 6

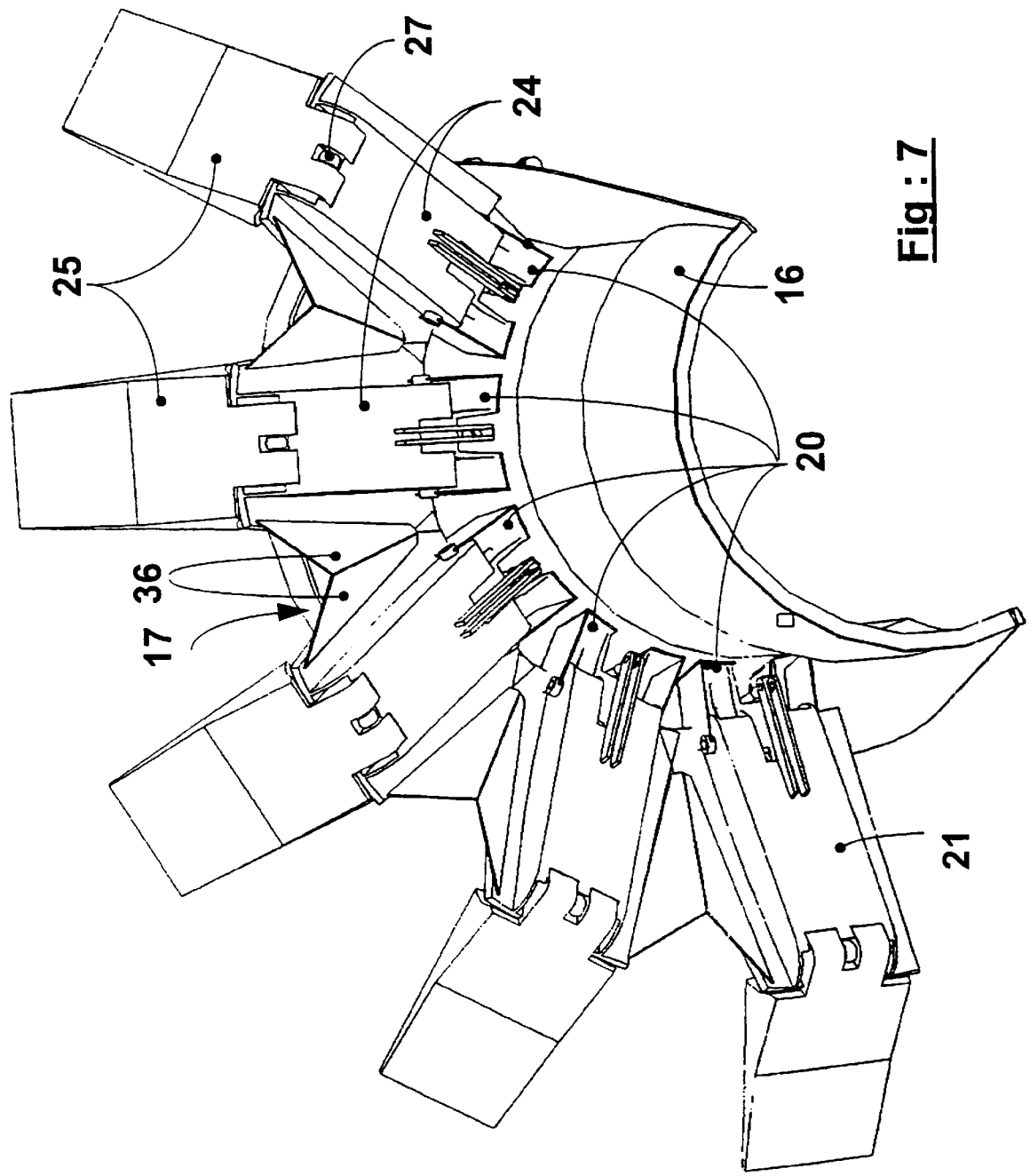

THRUST REVERSER FOR A HIGH BYPASS TURBOFAN ENGINE

BACKGROUND OF THE INVENTION

The present invention relates to a thrust reverser for a turbofan jet having a high bypass ratio in which the thrust reverser flaps are located on a jet engine cowling rearwardly of the turbofan cowling such that air passing over the outer surface of the jet engine cowling urges the thrust reverser flaps toward their forward thrust positions.

Turbofan-type turbojet engines are well known in the art and typically comprise a fan located at the front of the turbojet engine which directs a flow of bypass air through a duct bounded by the engine cowling on the inside and a fan cowling on the outside. The generally annular duct may channel both the bypass flow and the primary exhaust gas flow, or may channel only the bypass flow. In turbofan engines having high bypass ratios, typically the bypass duct channels only the bypass airflow from the turbofan.

In such applications, it is also known to provide a thrust reverser comprising a plurality of baffles or flaps which are movable between forward thrust positions and reverse positions in which the flaps redirect at least a portion the air emanating from the exit of the bypass duct in a direction so as to provide reverse thrust forces to the engine structure and the associated aircraft. In the forward thrust positions, the baffles or flaps are retracted so as to provide a smooth aerodynamic surface to the respective cowlings and to leave the exit of the bypass flow duct unobstructed to provide the optimum forward thrust. In some known types of thrust reversers, the movable baffles or flaps are located in the fan cowling, while in other types the baffles or flaps are located in the jet engine cowling. Typical known thrust reversers are disclosed in French Patents, 1,479,131; 2 625 261; and 2 650 861.

While these known thrust reversers have been generally successful, there exists a continuing need to reduce the complexity of such devices, reduce the width and bulk of the thrust reverser assembly, specifically regarding the outer diameter of the turbofan cowling to improve ground clearance, and to design such systems so as to facilitate access to the jet engine.

SUMMARY OF THE INVENTION

A thrust reverser is disclosed for a high bypass ratio turbofan jet engine having a fan cowling forming an outer boundary of an airflow duct and a jet engine structure including a jet engine cowling. The thrust reverser has a casing affixed to the jet engine structure, the casing having a forward collar, an intermediate radially extending flange, a plurality of longitudinally extending ribs affixed to the forward collar, the casing and the flange and a plurality of attaching yokes. A first thrust reverser flap is pivotally connected to a corresponding one of the attaching yokes and is located rearwardly of an exit of the airflow duct, each first thrust reverser flap having a distal end and being movable between a forward thrust position, wherein a first surface thereof is substantially flush with an outer surface of the jet engine cowling, and a reverse thrust position wherein the first thrust reverser flaps extend outwardly from the jet engine cowling so as to redirect airflow emanating from the airflow duct. A second thrust reverser flap is pivotally connected to the distal end of a corresponding one of the first thrust reverser flaps and is also movable between a forward thrust position, wherein a second surface thereof is substantially flush with the outer surface of the jet engine cowling, and a reverse thrust position, wherein the second thrust reverser flaps also redirect air flow emanating from the air flow duct. An actuating mechanism is connected to the casing and to at least one of the first thrust reverser flaps to move them between their forward and reverse thrust positions. A linkrod connected to a corresponding one of the second thrust reverser flaps and the corresponding attaching yoke moves the second thrust reverser flaps between their forward and reverse thrust positions as the corresponding first thrust reverser flap is moved between its forward and reverse thrust positions.

The thrust reverser according to the present invention provides a smooth aerodynamic outer surface to the jet engine cowling during forward thrust operation to minimize disturbances in the airflow emanating from the exit of the bypass airflow duct. The casing may be pivotally attached to an engine support strut so as to be easily moved away from the engine structure to facilitate access to the jet engine for maintenance and/or repairs.

The pivoting movement of the first and second thrust reverser flaps is against the airflow flowing over the jet engine cowling and the flow of air emanating from the bypass airflow duct such that, in case of a failure of the actuating system, the forces acting on the thrust reverser flaps by the airflow urges the flaps toward their forward thrust positions, to thereby prevent accidental or inadvertent deployment of the thrust reverser flaps.

BRIEF DESCRIPTION OF DRAWINGS

FIG. 1 is a cross-sectional schematic view illustrating a high bypass ratio turbofan engine having the thrust reverser according to the present invention.

FIG. 2 is a partial, cross-sectional view of the thrust reverser according to the present invention with the flaps in their forward thrust positions.

FIG. 3 is a cross-sectional view taken along line III—III in FIG. 2.

FIG. 4, is a partial, cross-sectional view of the thrust reverser according to the present invention illustrating the thrust reverser flaps in their reverse thrust positions.

FIG. 5 is a perspective view of a portion of the casing utilized in the thrust reverser according to the present invention.

FIG. 6 is a perspective view of the casing according to the present invention with the thrust reverser flaps in their reverse thrust positions.

FIG. 7 is a rear view of the casing in FIG. 6 with the flaps in their reverse thrust positions.

DETAILED DESCRIPTION OF THE PREFERRED EMBODIMENT

FIG. 1 illustrates a turbofan-type jet aircraft engine having a very high bypass ratio, the turbofan engine comprising a jet engine 1 which has an air inlet 2 and an exhaust gas outlet 3. The structure and functions of such jet engines are well known in the art and need not be discussed further in detail. An annular duct 4 extends around the jet engine 1 and constitutes a bypass airflow duct for the bypass air passing through the inlet of the duct in the direction of arrow 5 and exiting from the bypass flow duct in the direction of arrow 6. A turbofan 7 is located within the annular duct 4 and is driven, in known fashion by the jet engine 1. The fan 7 comprises at least one stage of rotary compressing blades 8 and at least one deflecting stage of stationary vanes 9. The bypass airflow duct 4 has an outer boundary wall 10 formed as a portion of the fan cowling 11. As can be seen, the axial length of the fan cowling 11 is significantly less than that of the jet engine 1 to reduce both the weight and the drag generated by the engine structure.

As illustrated in FIG. 1, the turbofan engine may be mounted beneath an aircraft wing 12 in a known manner by engine mounting strut 13. As illustrated, the turbofan engine includes a thrust reverser 14 movable between a forward thrust position, as illustrated in solid lines in FIG. 1, and a reverse thrust position, illustrated by the dashed lines in FIG. 1. In the case of a very high bypass ratio turbofan engine, the largest portion of the total thrust is generated by the bypass airflow 6 at the rear of the bypass airflow duct 4. The thrust reverser 14 acts on the airflow emanating from the exit of the bypass airflow duct 4.

As illustrated in FIGS. 1, 2 and 3, the thrust reverser 14, when in the forward thrust mode, has its elements housed within jet engine cowling 15 which encloses the jet engine 1 and a portion of which forms the inner boundary wall of the bypass airflow duct 4. The thrust reverser 14 comprises an inner casing 16 formed in two halves, the casing having at its forward end a generally U-shaped collar 17 which is affixed to a forward portion of the jet engine cowling 15. As illustrated in FIG. 5, the casing 16 includes an intermediate, radially extending flange 18 and a plurality of circumferentially spaced apart, longitudinally extending ribs 19 that connect the collar 17, the casing 16 and the flange 18. A plurality of attaching yokes 20 are mounted in the casing 16 and extend generally radially outwardly therefrom to the rear of the flange 18.

Subassemblies 21, which include a casing half 16 along with the associated thrust reverser flaps and actuating systems, may be pivotally supported on the jet engine mounting strut 13 by pivot connections 22, as illustrated in FIG. 3. The lower portions of each of the sub-assemblies 21 incorporate known locking and latching mechanism to retain the subassemblies in position within the jet engine cowling 15. To facilitate access to the jet engine, the lower portions of the subassemblies 21 may be unlatched and one or both of the subassemblies pivoted upwardly about pivot attachment 22 to expose portions of the jet engine for maintenance and/or repair. An actuating cylinder 23 may be provided between the subassemblies 21 and engine mounting strut 13 to assist in the pivoting movement of the subassemblies relative to the jet engine 1.

FIG. 4 illustrates the flaps of the thrust reverser 14 in their forward thrust positions, which are also illustrated in dashed lines in FIG. 1. As can be seen, in the reverse thrust positions, the flaps redirect the air emanating from the bypass airflow duct 4 into a direction which provides a reverse thrust force to the engine structure and to the associated aircraft. The thrust reverser 14 comprises a plurality of first thrust reverser flaps 24 which are each pivotally attached to an associated attaching yoke 20 by pivot connection 26. Each of the first flaps 24 has a distal end to which is pivotally attached a second thrust reverser flap 25 by pivot 27. A control system for actuating the first and second flaps and moving them between their forward and reverser thrust positions may comprise a linear actuator 28 attached to a mounting bracket 37 which is, in turn, affixed to the casing 16. The linear actuator 28 has an extendible and retractable rod 29 which is pivotally attached to the bracket 31 at pivot connection 30. Bracket 31 is fixedly attached to the first thrust reverser flap 24. As can be seen in FIGS. 2 and 4, extension and retraction of the rod 29 will cause the first thrust reverser flap 24 to pivot about hinge point 26 between the forward thrust position, illustrated in FIG. 2, and the reverse thrust position, illustrated in FIG. 4. When in the forward thrust position, an outer surface of the thrust reverer flap 24 is substantially flush with the outer surface of the jet engine cowling 15. In the forward thrust positions, an outer surface of the second thrust reverser flap 25 is also substantially flush with the outer surface of both the first thrust reverser flap and adjacent portions of the jet engine cowling such that both of the flaps provide a smooth, aerodynamic outer surface to the jet engine cowling.

The second thrust reverser flap 25 is also pivoted with respect to the first thrust reverser flap 24 as these elements move between their forward and reverse thrust positions. Such movement of the second thrust reverser flap is achieved by linkrod 32 which is pivotally connected to a second thrust reverser flap 25 at pivot 33 and to an associated attaching yoke 20 at pivot 34. As best seen in FIG. 4, the pivots 26, 34, 27 and 33 are located at apexes of a quadrilateral and the linkrod 32 extends diagonally across the quadrilateral between pivots 33 and 34. Linkrod 32 is also contained within the first thrust reverser flap 24. Thus, second thrust reverser flap 25 is cause to rotate about pivot connection 27 in the same direction as the rotation of first thrust reverser flap 24 about its pivot connection 26. The casing 16 separates and insulates the thrust reverser 14 from the jet engine 1.

Access to the linear actuators 28 may be provided by a panel 35 removably or pivotally attached to the jet engine cowling 15 and located between the flange 18 and the front collar 17 of the casing 16. The panel 35 may be pivotally attached to the cowling 15 so as to pivot about pivot shaft 38 between open and closed positions. As can be seen, when the panel 35 is open, linear actuators 28 are readily accessible for maintenance and/or repair.

As illustrated in FIGS. 6 and 7, each sub-assembly 21 may each have five pairs of first and second thrust reverser flaps 24 and 25 respectively. Sealing between adjacent pairs of first thrust reverser flaps 24 in their reverse thrust positions is accomplished by follower flaps 36 which are hingedly attached to the adjacent first thrust reverser flaps 24 and to each other. When the first thrust reverser flaps 24 are in their reverse thrust positions, the follower flaps 36 increase the effectiveness of the thrust reversing by blocking the space between adjacent first thrust reverser flaps 24. The follower flaps 36 will fold so as to prevent the first thrust reverser flaps 24 to be moved to their forward thrust positions.

The thrust reverser 14 according to the present invention enables a reduction of the aerodynamic drag on the engine structure, while at the same time reducing the weight of the engine structure. The linear actuators 28 may be hydraulic linear actuators and may be connected to the low pressure portion of the aircraft hydraulic circuit such that, in case of a malfunction of the hydraulic control system, the aerodynamic forces acting on the first and second thrust reverser flaps 24 and 25 will urge the flaps toward their forward thrust positions, thereby preventing any inadvertent deployment of the thrust reverser flaps.

The foregoing description is provided for illustrative purposes only and should note be construed as in any way limited this invention, the scope of which is defined solely by the appended claims.

We claim:

1. A thrust reverser for a turbofan jet engine having a fan cowling forming an outer boundary of an air flow duct and a jet engine structure including a jet engine cowling, the thrust reverser comprising:

a) a casing affixed to the jet engine structure, the casing having a forward collar, an intermediate radially extending flange, a plurality of longitudinally extending ribs affixed to the forward collar, the casing and the flange, and a plurality of attaching yokes;

b) a first thrust reverser flap pivotally connected to a corresponding one of the attaching yokes and located rearwardly of an exit of the air flow duct, each first thrust reverser flap having a distal end and being movable between a forward thrust position, wherein a first surface thereof is substantially flush with an outer surface of the jet engine cowling, and a reverse thrust position, wherein the first thrust reverser flaps extend outwardly from the jet engine cowling so as to redirect air flow emanating from the air flow duct;

c) a second thrust reverser flap pivotally connected to the distal end of a corresponding one of the first thrust reverser flaps and movable between a forward thrust position, wherein a second surface thereof is substantially flush with the outer surface of the jet engine cowling, and a reverse thrust position, wherein the second thrust reverser flap redirects air flow emanating from the air flow duct;

d) an actuating mechanism connected to the casing and to the first thrust reverser flaps to move the first thrust reverser flaps between the forward and reverse thrust positions; and, e) a linkrod connected to a corresponding one of the second thrust reverser flaps and the corresponding attaching yoke to move the second thrust reverser flap between the forward and reverse thrust positions as the corresponding first thrust reverser flap moves between the forward and reverse thrust positions.

2. The thrust reverser of claim 1 wherein the linkrod is located within the corresponding first thrust reverser flap.

3. The thrust reverser of claim 2 wherein the pivot connection between the first thrust reverser flap and the corresponding attaching yoke, the pivot connection between the linkrod and the corresponding attaching yoke, the pivot connection between the corresponding first and second thrust reverser flaps and the pivot connection between the linkrod and the corresponding second thrust reverser flap are at apexes of a quadrilateral and wherein the linkrod subtends a diagonal of the quadrilateral.

4. The thrust reverser of claim 1 wherein the first thrust reverser flap is pivotally connected to the corresponding attaching yoke at a forward end portion, and the distal end of the first thrust reverser flap is pivotally connected to a forward end portion of the corresponding second thrust reverser flap whereby air flowing over the outer surface of the jet engine cowling urges the first and second thrust reverser flaps toward the forward thrust positions.

5. The thrust reverser of claim 1 wherein the jet engine structure further comprises a jet engine mounting strut and wherein the casing has two casing portions, each casing portion pivotally connected to the jet engine mounting strut.

6. The thrust reverser of claim 1 wherein the actuating mechanism comprises a linear actuator having a cylinder connected to the casing and an extendable and retractable rod connected to at least one of the first thrust reverser flaps.

* * * * *